(12) United States Patent
Kirste et al.

(10) Patent No.: US 9,041,385 B2
(45) Date of Patent: May 26, 2015

(54) POSITION DETECTING DEVICE AND METHOD FOR PRODUCING A MARKING ARRANGEMENT FOR A POSITION DETECTING DEVICE

(75) Inventors: Vinzenz Kirste, Bonaduz (CH); Claudio Gian Köppel, Trimmis (CH)

(73) Assignee: HAMILTON BONADUZ AG, Bonaduz (CH)

( * ) Notice: Subject to any disclaimer, the term of this patent is extended or adjusted under 35 U.S.C. 154(b) by 264 days.

(21) Appl. No.: 13/642,569

(22) PCT Filed: Apr. 20, 2010

(86) PCT No.: PCT/EP2010/055220
§ 371 (c)(1),
(2), (4) Date: Mar. 4, 2013

(87) PCT Pub. No.: WO2011/131232
PCT Pub. Date: Oct. 27, 2011

(65) Prior Publication Data
US 2013/0200886 A1 Aug. 8, 2013

(51) Int. Cl.
| | |
|---|---|
| G01B 7/14 | (2006.01) |
| G01B 7/00 | (2006.01) |
| G01D 5/245 | (2006.01) |
| G01D 5/249 | (2006.01) |
| G01D 5/347 | (2006.01) |

(52) U.S. Cl.
CPC .............. *G01B 7/003* (2013.01); *G01D 5/2455* (2013.01); *G01D 5/2492* (2013.01); *G01D 5/34792* (2013.01)

(58) Field of Classification Search
CPC .............................. G01D 5/2451; G01R 33/02
See application file for complete search history.

(56) References Cited

U.S. PATENT DOCUMENTS

| | | | | |
|---|---|---|---|---|
| 5,442,147 | A | * | 8/1995 | Burns et al. ................. 178/18.09 |
| 5,894,678 | A | * | 4/1999 | Masreliez et al. .............. 33/762 |
| 6,054,851 | A | * | 4/2000 | Masreliez et al. ........ 324/207.17 |
| 6,157,188 | A | * | 12/2000 | Steinke .................... 324/207.17 |
| 7,999,536 | B2 | * | 8/2011 | Santos et al. ............... 324/207.2 |

FOREIGN PATENT DOCUMENTS

| | | |
|---|---|---|
| DE | 39 42 625 A1 | 6/1990 |
| DE | 10 2008 020110 A1 | 10/2009 |
| WO | 9110288 A2 | 7/1991 |

* cited by examiner

*Primary Examiner* — Arleen M Vazquez
*Assistant Examiner* — Feba Pothen
(74) *Attorney, Agent, or Firm* — Rothwell, Figg, Ernst & Manbeck, P.C.

(57) ABSTRACT

A position detecting device for detecting a positional relationship between a first component and a second component includes a marking arrangement which is provided on the first component and has an absolute track and an incremental track. The absolute track has a plurality of absolute markings from which a binary absolute code sequence can be read, and the incremental track has a plurality of incremental markings which are associated with the absolute markings and from which an alternating incremental sequence can be read. A sensor arrangement provided on the second component and is configured to scan the absolute markings and the incremental markings. The absolute code sequence is formed from a first and a second De Bruijn sequence of order N which follow one another.

10 Claims, 3 Drawing Sheets

POSITION DETECTING DEVICE AND METHOD FOR PRODUCING A MARKING ARRANGEMENT FOR A POSITION DETECTING DEVICE

CROSS REFERENCE TO RELATED APPLICATION

This application is a 35 U.S.C. 371 National Phase Entry Application from PCT/EP2010/055220, filed Apr. 20, 2010, the disclosure of which is incorporated herein in its entirety by reference.

BACKGROUND OF THE INVENTION

1. Field of the Invention

The present invention relates to a position detecting device for detecting a positional relationship between a first component and a second component, comprising a marking arrangement which is provided on the first component and has an absolute track and an incremental track, the absolute track having a plurality of absolute markings from which a binary absolute code sequence can be read, and the incremental track having a plurality of incremental markings which are associated with the absolute markings and from which an alternating incremental sequence can be read, and comprising a sensor arrangement which is provided on the second component and is configured to scan the absolute markings and the incremental markings. The invention also relates to a method for producing a marking arrangement for a position detecting device and to a position detecting device having a marking arrangement produced by a method of this type.

2. Description of the Related Art

Position detecting devices and methods of the type mentioned above are used in the prior art, for example in machines and installations in which two components are arranged such that they can be moved or rotated relative to one another and information about the extent of the mutual movement or rotation of the two components is to be acquired. In this respect, a movement of the components can be a distance along a linear or curved displacement path or a rotational movement of the two components can be an angle of rotation or a curved length along a circular path. From the absolute markings, the sensor arrangement of known position detecting devices can read out information about the absolute extent of the movement or rotation of the two components (an absolute position) in any position of the marking arrangement, the accuracy of the absolute information being restricted to the distance between two adjacent absolute markings. To accurately detect the positional relationship, the sensor arrangement also scans the alternating incremental sequence of the incremental markings and establishes a relative position between two adjacent incremental markings. The exact positional relationship of the two components to one another can be determined from a combination of the relative position and the absolute position.

For known position detecting devices, marking arrangements and sensor arrangements based on the detection of magnetic fields are often used. In this respect, the absolute track and the incremental track can each be formed by a magnetised tape along the direction of movement of the two components, each tape comprising a plurality of magnetic poles which are arranged at equal distances along the running direction of the tape and at which the tape is magnetised in a vertical direction to the surface of the tape, the direction of the magnetisation encoding the binary value of the respective pole. A magnetic sensor arrangement, guided past the tape, of the other component can then read out the magnetisation of the individual poles and, for example, can recognise a detected north pole as signal "1" and a detected south pole as signal "0".

FIG. 1 schematically shows a position detecting device of the prior art for detecting a positional relationship between a first component 110 and a second component 111, which components can be moved linearly relative to one another along a displacement path X. The position detecting device comprises a marking arrangement 112 mounted on the first component 110 and a sensor arrangement 113 which is attached to the second component 111 and reads out the marking arrangement 112. The marking arrangement 112 has an absolute track 114 with a plurality of absolute markings 116 which encodes a binary absolute code sequence B'={1, 1, 0, 0, 1, 0, 1, 1, 1, 1, 0, 1, 0, 0, 0, 0}. Also belonging to the marking arrangement 112 is an incremental track 118 with a plurality of incremental markings 120, the incremental track 118 encoding an alternating incremental sequence I'={1, 0, 1, 0, 1, 0, 1, 0, 1, 0, 1, 0, 1, 0, 1, 0}. The absolute track 114 and the incremental track 118 run parallel to one another and the respective successive markings 116, 120 thereof are at the same intervals to one another in each case.

The sensor unit 113 comprises an absolute sensor array 122 with four absolute sensors 124 which can simultaneously read out a sequence of four successive absolute markings 114. Also provided in the sensor unit 113 is an incremental sensor 126 which detects the incremental marking 120 and provides a signal corresponding to a position between two adjacent incremental markings 120.

The absolute code sequence B' of the absolute track 114 is encoded on the basis of a De Bruijn sequence of order 4.

The term "De Bruijn sequence of order N" is understood as meaning a cyclic sequence of characters of a predetermined set of characters A in which each subsequence of length N, which can be obtained from the set of characters A, is contained precisely once. For the purpose of this definition, subsequences are read with the proviso that the last character of the De Bruijn sequence is again followed by the first character of the De Bruijn sequence. Accordingly, the cyclical characteristic of the De Bruijn sequence is expressed in the fact that the sequence can be divided up anywhere into two subsequences, and after interchanging the two subsequences (adding the first subsequence at the end of the second subsequence), a De Bruijn sequence of order N is again achieved according to the above definition. In other words, the De Bruijn sequence can be shifted cyclically to the right or to the left and, during each shift by one place, a character arranged at one end of the De Bruijn sequence is removed and is added to the opposite end of the De Bruijn sequence (cyclic shift by one place). During each cyclic shift of the De Bruijn sequence, a De Bruijn sequence of the same order N is again produced.

For the present use of marking arrangements with a binary absolute code sequence, De Bruijn sequences with a binary set of characters are of interest in which either the value "0" or the value "1" is associated with each place of the De Bruijn sequence, i.e. with each marking.

Binary De Bruijn sequences of order N have a number of places of $2^N$ so that the length L of an absolute track formed thus is given by $$L = p \cdot 2^N,$$

where p represents the pole pitch, i.e. the distance along the absolute track between two adjacent absolute markings. Thus, with a sensor unit for detecting N successive absolute markings, it is possible to scan an absolute track, the absolute markings of which encode a De Bruijn sequence of order N, in which case the movement, which can then be maximally detected by the position detecting device, between the two components is given by the length L, to be calculated as above, of the absolute track.

In order to increase the maximum distance, which can be detected by a known position detecting device, of the relative movement between the two components, it might be possible to increase the order N of the De Bruijn sequence, stored in the absolute track, to increase the length L of the absolute track in accordance with the above-mentioned equation. However, this would increase the length of the sensor arrangement in the direction of the displacement path, since, according to the conventional detection principle, the sensor arrangement has to be configured for scanning N successive absolute markings. Alternatively, it might be possible to increase the distance between successive markings (pole pitch p). In this case as well, at least the installation space of the sensor arrangement would have to be increased accordingly to be able to read out N successive absolute markings, and on the other hand, with a solution of this type, the accuracy of detection of the relative position on the basis of the incremental markings would be diminished.

It is therefore the object of the present invention to provide a position detecting device for detecting a positional relationship between two components as well as a method for producing a marking arrangement for a position detecting device, using which device and method it is possible to detect a positional relationship between two components, arranged movably relative to one another, over a relatively long total distance, without having to accept significant disadvantages in respect of the cost and installation space of the position detecting device or in respect of the accuracy of the detection.

BRIEF SUMMARY OF THE INVENTION

According to a first aspect of the present invention, the object of the invention is achieved by a position detecting device for detecting a positional relationship between a first component and a second component, comprising a marking arrangement which is provided on the first component and has an absolute track and an incremental track, the absolute track having a plurality of absolute markings from which a binary absolute code sequence can be read, and the incremental track having a plurality of incremental markings which are associated with the absolute markings and from which an alternating incremental sequence can be read, and comprising a sensor arrangement which is provided on the second component and is configured to scan the absolute markings and the incremental markings, the absolute code sequence being formed from a first and a second De Bruijn sequence of order N which follow one another, the second De Bruijn sequence being a cyclic shift of the first De Bruijn sequence and the first De Bruijn sequence ending with a first subsequence of length N−1 and containing a second subsequence of length N−1 which is identical to the first subsequence and is shifted relative to the first subsequence by an uneven number of places, and the second De Bruijn sequence being shifted cyclically with respect to the first De Bruijn sequence such that it ends with the second subsequence.

According to an important feature of the invention, the absolute code sequence of the absolute track is formed from a linking of two De Bruijn sequences of order N, the two De Bruijn sequences being cyclically shifted relative to one another in a predetermined manner. When the two interlinked De Bruijn sequences satisfy the above-mentioned conditions according to the invention, the interlinking of the two De Bruijn sequences produces an absolute code sequence in which each binary sequence of length N appears in precisely two places which are shifted relative to one another by an uneven number of places, and for the first occurrence of the sequence, the alternating incremental sequence exhibits a different value compared to the second occurrence of the sequence.

Due to a combination of the N read-out absolute markings and of a detected binary value of the incremental marking, it is thus possible for the read-out sequence of length N to be unambiguously identified and the absolute position of the first component compared to the second component can be unambiguously determined over the entire length of the absolute code sequence. Since the absolute code sequence according to the invention is formed from two linked De Bruijn sequences of order N, the total length of the distance which can be scanned amounts to twice the distance which can be detected using a marking arrangement of the prior art. Thus, the position detecting device according to the invention can travel a total distance, the length of which is $$L = p \cdot 2^{N+1}$$

with a sensor arrangement which is configured to detect N successive absolute markings (for example with N sensors for absolute markings). It is true that for this, the sensor arrangement has to be able to detect a binary value of the incremental track. However, the technical measures which may be required for this can be implemented at least without lengthening the sensor arrangement in the direction of the displacement path, so that in this respect, an increase in the installation space and an increase in cost of the device can be avoided.

In a preferred embodiment of the invention, the position detecting device comprises an electronic control means which is connected to the sensor arrangement to receive a first sensor signal corresponding to a scanning of the absolute track, a second sensor signal corresponding to a scanning of the incremental track and a third sensor signal corresponding to a detected relative position between two successive incremental markings, and which is configured to determine the positional relationship between the components on the basis of the first sensor signal, the second sensor signal and the third sensor signal. Thus, in an embodiment of this type, not only is the binary information for clearly identifying the sequence read out from the absolute track obtained from the incremental track, but information is also read out about an exact relative position of the sensor arrangement between two successive markings. The doubling according to the invention of the maximum distance which can be scanned can therefore be achieved without any losses in respect of the accuracy of the position detection.

A plurality of the mentioned sensor signals could also originate from one and the same sensor. In particular, the second and third sensor signals which are both produced from a scanning of the incremental track could be derived from the signal of an incremental sensor (for example in each case as the sign part (binary value) and as the amount part).

In an implementation, constructed in a particularly simple manner, of the last mentioned embodiment, it can be provided that the electronic control means comprises a memory means in which an absolute position value, formed by N+1 bits, is stored, the electronic control means setting N bits of the absolute position value according to the first sensor signal and setting one bit of the absolute position value according to the second sensor signal. An electronic control means of this type provides the absolute part of the detected positional relationship between the components, the absolute position, as N+1 bit value in a particularly fast and reliable manner without interconnected evaluation algorithms, so that the necessary electronic switching means can be simplified and the position detecting device operates reliably even at high relative speeds between the two components.

In principle, the sensor arrangement could be configured to detect more than N absolute markings and/or could detect non-successive absolute markings, for example to also allow redundancy during the position detection. However, the advantages according to the invention of a reduced installation space of the sensor arrangement and of a particularly cost-effective construction are provided in particular when the sensor arrangement is configured to detect exactly N successive absolute markings. Thus, the length of the sensor arrangement in a direction parallel to the absolute track or to the incremental track, for example, can be precisely such that the sensor arrangement covers precisely N successive absolute markings, and/or precisely N sensors for detecting a respective absolute marking could be present.

It should be noted that the mention of detection of a plurality (in particular N) absolute markings by the sensor arrangement means the detection of these markings within a time window in which the two components, at least within the region of the pole pitch, are in a specific positional relationship relative to one another. The sensor arrangement is generally configured to detect the plurality of absolute markings simultaneously (for example by means of a plurality of sensors).

In a position detecting device according to the invention, the scanning of the marking arrangement is preferably based on a magnetic interaction between the sensor arrangement and the absolute markings and/or the incremental markings. Thus, the absolute track and/or the incremental track can be a magnetised tape, the magnetisation of which is directed vertically to the surface of the tape, the absolute markings and the incremental markings being formed by a sequence of poles with directed magnetisation. For example, a north pole can encode a binary value "1" and a south pole can encode a binary value "0". The sensor arrangement can then comprise a magnetic field sensor array with a plurality of magnetic field sensors (for example Hall effect sensors in a Hall array). Alternatively, the marking arrangement could comprise an optically scannable marking and the sensor arrangement could comprise optical sensors, for example it could detect reflected light from a scanning laser.

The position detecting device of the invention can be configured to detect a linear displacement position between two linearly displaceable components, for example in a linear guide between a static rail and a slide which can move linearly thereon. In this case, the absolute track and the incremental track can run parallel to the displacement path.

Alternatively, a position detecting device of the invention can be used to detect a rotational position between two components which are configured to rotate relative to one another, in which case the marking arrangement can then be arranged on a portion of the first component which moves along a circular path relative to the sensor arrangement of the second component, so that the absolute track and the incremental track each have a curved path.

If the position detecting device is configured to detect a rotational position between the components, then in a particularly preferred variant of the invention, the absolute track and the incremental track can revolve around a rotational axis of the components, a beginning of the second De Bruijn sequence adjoining an end of the first De Bruijn sequence and a beginning of the first De Bruijn sequence adjoining an end of the second De Bruijn sequence. In a variant of this type, the cyclical characteristic of the absolute track and of the incremental track is utilised in a particularly advantageous manner to reliably detect the rotational position between the components by a full 360°. The absolute track and the incremental track then revolve round the rotational axis of the components annularly and endlessly so that each sequence of length N along the circumference around the rotational axis occurs precisely twice in the absolute track, in each case for different values of the incremental track.

According to a second aspect, the above object of the invention is achieved by a method for producing a marking arrangement for a position detecting device for detecting a positional relationship between a first component and a second component, the position detecting device comprising a sensor arrangement for scanning the marking arrangement, in particular for a position detecting device according to any one of the preceding claims, the method comprising the following steps:

provision of an initial De Bruijn sequence of order N,
identification of a first subsequence of length N−1 and of a second subsequence of length N−1 which are identical to one another and occur within the initial De Bruijn sequence, shifted relative to one another by an uneven number of places,
provision of a first De Bruijn sequence of order N by cyclically shifting the initial De Bruijn sequence so that the first De Bruijn sequence ends with the first subsequence,
provision of a second De Bruijn sequence of order N by cyclically shifting the initial De Bruijn sequence so that the second De Bruijn sequence ends with the second subsequence,
provision of an absolute code sequence by linking the first De Bruijn sequence and the second De Bruijn sequence,
provision of an absolute track from a plurality of absolute markings encoding the absolute code sequence, and
provision of an incremental track from a plurality of incremental markings which are associated with the absolute markings and encode an alternating incremental sequence.

A marking arrangement having two linked De Bruijn sequences of order N can be provided as the absolute code sequence of an absolute track using a method of the second aspect of the invention, the described steps of the method being particularly suitable for automatic processing so that marking arrangements of a longer length, i.e. with De Bruijn sequences of a higher order, can be produced using simple technical means. The absolute code sequences obtained thereby allow the encoding of a maximum distance between the components of $$L = p \cdot 2^{N+1}$$

using a sensor arrangement which scans N successive absolute markings so that with the marking arrangement produced according to the invention, a doubling of the maximum possible distance can likewise be achieved, without having to accept, for example, a lengthening of the sensor arrangement along the distance. With the method of the second aspect of the invention, in particular a marking arrangement for a position detecting device according to the first aspect of the invention can be produced in a simple and reliable manner, so that the advantages and effects, described above in connection with the position detecting device of the first aspect of the invention, also come into effect for corresponding variants of the method of the second aspect of the invention.

According to a third aspect of the invention, the above-mentioned object of the invention is achieved by a position detecting device for detecting a positional relationship between a first component and a second component, in particular a position detecting device according to the first aspect of the invention, comprising a marking arrangement which is provided on the first component and has an absolute track and an incremental track, it being possible to obtain the marking arrangement by a method according to the second aspect of the invention, and comprising a sensor arrangement which is provided on the second component and is configured to scan the absolute markings and the incremental markings of the marking arrangement. The marking arrangement which can be obtained by the method of the second aspect of the invention has the linking according to the invention of two De Bruijn sequences of order N, so that every possible sequence of length N in the absolute code sequence obtained thus occurs precisely twice, in each case for different values of the incremental sequence. The position detecting device of the third aspect thus also allows a doubling of the maximum scannable distance along the displacement or rotation of the two components, in particular when the length of the sensor arrangement remains constant in the direction of movement.

BRIEF DESCRIPTION OF THE DRAWING(S)

In the following, the invention will be described in more detail on the basis of preferred embodiments with reference to the accompanying drawings, in which.

DETAILED DESCRIPTION OF THE INVENTION

Figure 1:
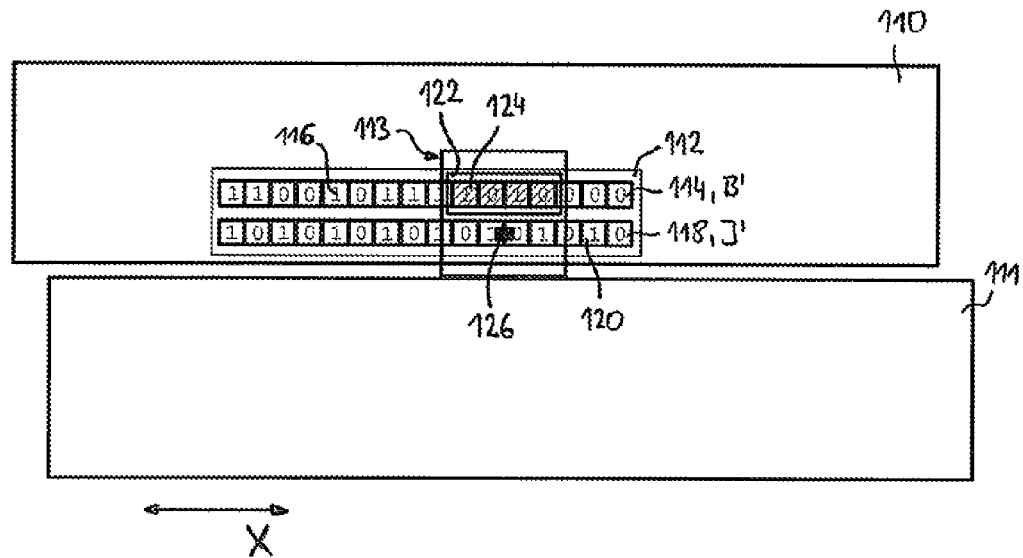
FIG. 1 is a schematic view of a position detecting device of the prior art.
Figure 2:
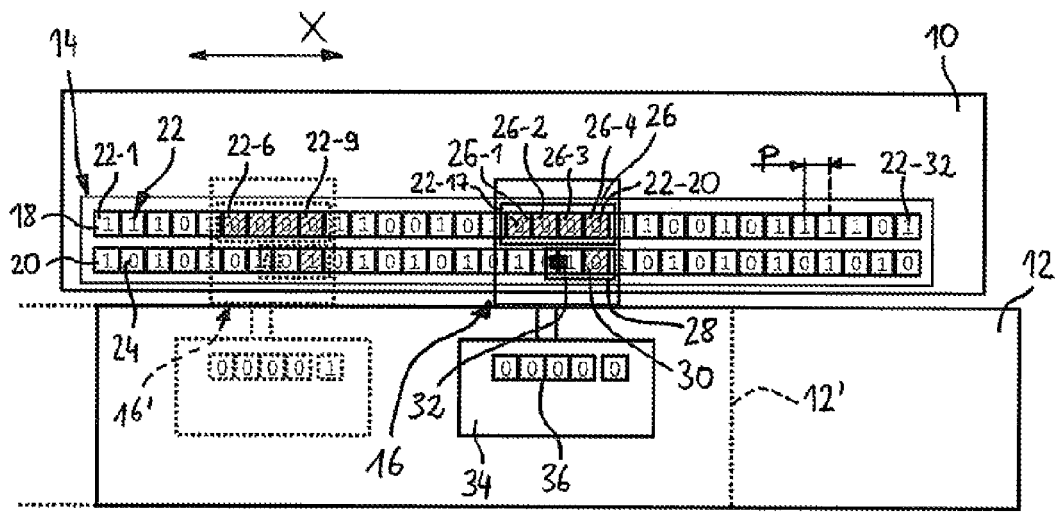
FIG. 2 is a schematic view of a position detecting device, configured as a linear encoder, according to a first embodiment of the present invention.

A position detecting device, shown in FIG. 2, of a first embodiment of the invention is a linear encoder which detects a linear movement between a first component 10 and a second component 12 along a straight displacement path X. For this purpose, the position detecting device comprises a marking arrangement 14 attached to the first component 10 and a sensor arrangement 16 which is attached to the second component 12 and is to scan the marking arrangement 14. From the marking arrangement 14, the sensor arrangement 16 reads out information concerning the position of the sensor arrangement 16 along the marking arrangement 14.

The marking arrangement 14 can comprise an absolute track 18 and an incremental track 20 which run parallel to the displacement path X. Configured along the absolute track 18 is a plurality of absolute markings 22, it being possible for one 1-bit binary value, i.e. "1" or "0" to be read out from each absolute marking 22. In this manner, the plurality of absolute markings 22 encodes an absolute code sequence B. In the present embodiment, 32 absolute markings 22-1, 22-2, ..., 22-32 encode the absolute code sequence:

B={1, 1, 1, 0, 1, 0, 0, 0, 0, 1, 1, 0, 0, 1, 0, 1, 0, 0, 0, 0, 1, 1, 0, 0, 1, 0, 1, 1, 1, 1, 0, 1}.

The incremental track 20 comprises a plurality of incremental markings 24 which are arranged one after another along the displacement path X, each incremental marking 24 storing one 1-bit binary value, i.e. "1" or "0", so that an incremental sequence I can be read out from the incremental markings. In the embodiment, the incremental track stores the alternating incremental sequence:

I={1, 0, 1, 0, 1, 0, 1, 0, 1, 0, 1, 0, 1, 0, 1, 0, 1, 0, 1, 0, 1, 0, 1, 0, 1, 0, 1, 0, 1, 0}.

In the present embodiment, the absolute track 18 and the incremental track 20 are recorded as magnetised tracks on a magnetic tape which is attached to the first component 10 along the displacement path X. Alternatively, the absolute track 18 and the incremental track 20 could be recorded on two separate, parallel magnetic tapes.

The interval between two successive absolute markings 22 is the same as the interval between two successive incremental markings 24 and is denoted as the pole pitch p. The pole pitch p is preferably constant for all markings along the absolute track 18 and the incremental track 20, respectively. In the displacement direction X, the markings 22, 24 can further be arranged relative to one another such that positioned next to each absolute marking 22 is precisely one incremental marking 24 associated with this absolute marking 22, i.e. such that the markings 22, 24 associated with one another in pairs are located in the same position along the displacement path X. Particularly in the case of magnetic scanning, the pole pitch p can be between approximately 1 mm and approximately 5 mm.

The sensor arrangement 16 travels over the absolute track 18 and the incremental track 20. The sensor arrangement 16 can comprise an absolute track sensor unit 26 for simultaneously detecting a predetermined number of successive absolute markings 22, for example a corresponding number of first binary value sensors 26-1, 26-2, 26-3, 26-4 (indicated in FIG. 2 by hatching). In the embodiment, four first binary value sensors 26-1, 26-2, 26-3, 26-4 are provided for simultaneously detecting four successive absolute markings 22-17, 22-18, 22-19, 22-20.

The sensor arrangement 16 can comprise an incremental track sensor unit 28 which is configured to detect the binary value of at least one incremental marking 24 over which the sensor arrangement 16 has just traveled as well as to detect information about a relative position of the sensor arrangement 16 between two adjacent incremental markings 24. For this purpose, the incremental track sensor unit 28 can have a second binary value sensor 30 (indicated in FIG. 2 by hatching) for reading out a binary value ("1" or "0") from an incremental marking 24 and it can also have an incremental sensor 32, known per se, for detecting the relative position or intermediate position between adjacent incremental markings 24.

In the embodiment, the second binary value sensor 30 reads an incremental marking 24 which is associated with one of the four absolute markings 22-17, 22-18, 22-19, 22-20 (for example of the absolute marking 22-20 on the extreme right) which are just being read out by the absolute track sensor unit 26.

In the case of magnetic scanning, the sensors or sensor units of the sensor arrangement 16 described above can comprise at least one Hall effect sensor or an arrangement of a plurality of Hall effect sensors or can comprise at least one or more AMR sensors (sensors using the anisotropic magnetoresistive effect). An incremental sensor 32 based on the Hall effect or on the AMR effect can achieve a positional accuracy (resolution) within a range of approximately 0.1 μm to approximately 100 μm.

As can be seen from FIG. 2, the absolute code sequence B of the absolute track 18 is formed from a linking of a first sequence B1 of length 16 and of a second sequence B2 of length 16, in particular from the sequences:

B1={1, 1, 1, 0, 1, 0, 0, 0, 0, 1, 1, 0, 0, 1, 0, 1}
B2={0, 0, 0, 0, 1, 1, 0, 0, 1, 0, 1, 1, 1, 1, 0, 1}.

Both sequences B1 and B2 are De Bruijn sequences of order 4. This means that every possible binary sequence of 4 bits (i.e. every 4-bit binary value, thus in all $2^4=16$ binary values) occurs precisely once in the first De Bruijn sequence B1 and also occurs precisely once in the second De Bruijn sequence B2. In this respect, it should be noted that this definition of the De Bruijn sequence starts from a cyclic reading of the sequence, i.e. on passing the respective end of the respective sequence B1, B2, the readout of the sequence is continued at the beginning of the same sequence B1 and B2. Thus, for example, the De Bruijn sequence B1 contains the subsequence {0, 1, 1, 0} precisely once, namely starting at the ninth place and ending at the twelfth place, and also contains, for example, the subsequence {0, 1, 1, 1} precisely once, namely starting at the fifteenth place and ending at the second place of B1.

In the embodiment, the second De Bruijn sequence B2 only differs from the first De Bruijn sequence B1 in that the second De Bruijn sequence B2 is shifted cyclically relative to the first De Bruijn sequence B1, here by five places to the left (or by eleven places to the right).

In the embodiment, the first De Bruijn sequence B1 ends with a first subsequence Ua={1, 0, 1} of length 3 and contains an identical second subsequence Ub={1, 0, 1} of length 3 a second time, but shifted by eleven places to the left relative to the first subsequence Ua, namely in the third place. It can also be seen that the second De Bruijn sequence B2 is cyclically shifted relative to the first De Bruijn sequence B1 such that the second De Bruijn sequence B2 ends precisely with the second subsequence Ub, i.e. the second De Bruijn sequence B2 is a right shift of the first De Bruijn sequence B1 by eleven places.

In the position detecting device of the embodiment, an absolute track 18 with an absolute code sequence B of this type achieves the following effect: when travelling over the marking arrangement 14, the absolute sensor unit 26 detects every possible sequence of four successive 1-bit values precisely twice. For example in FIG. 2, the dashed lines 12' and 16' illustrate the second component 12 and the sensor arrangement 16 in a first position in which the sensor arrangement 16 reads out the sequence {0, 0, 0, 0} from the absolute track 18 for the first time (namely from the absolute markings 22-6, 22-7, 22-8, 22-9), while the solid lines illustrate the second component 12 and the sensor arrangement 16 in a second position in which the sensor arrangement 16 reads out the sequence {0, 0, 0, 0} in another place along the displacement path X for the second time from the absolute track 18 (namely from the absolute markings 22-17, 22-18, 22-19, 22-20). It can be seen that in the two positions in which the sequence {0, 0, 0, 0} occurs, the incremental sensor unit 28 reads different values for the incremental markings 24 detected in each case in these positions. In particular, in the embodiment, the second binary value sensor 30 displays the value "1" in the first position and the value "0" in the second position. It has been found that this effect occurs for every possible 4-bit sequence which can be read out from the absolute track 18, and is the result of the configuration according to the invention of the interlinked De Bruijn sequences B1 and B2. The position of the sensor arrangement 16 (and thereby the positional relationship between the components 10, 12 in the accuracy range of the pole pitch p) can thus be unambiguously detected along the distance spanned by a total of two De Bruijn sequences B1, B2. For example, for a pole pitch p of approximately 2 mm (thus for example in the case of magnetic scanning), a scannable overall length L of the absolute track 18 of approximately $$L=p\cdot 2^{N+1}=2\text{ mm}\cdot 2^{4+1}=6.4\text{ cm}$$

results.

Furthermore, the position detecting device of the first embodiment can comprise an electronic control means 34 which is connected to the sensor arrangement 16 and receives from said sensor arrangement 16 a first sensor signal corresponding to the detection result of the absolute sensor unit 26, a second sensor signal corresponding to the detection result of the second binary value sensor 30 and a third sensor signal corresponding to the detection result of the incremental sensor 32.

The electronic control means 34 can comprise a memory means 36 in which an absolute position value, formed by 5 bits, can be stored and which represents the absolute position of the sensor arrangement 16 along the marking arrangement 14. 4 bits of the absolute position value stored in the memory means 36 reflect the binary values, read by the absolute sensor unit 26, of the absolute markings 22, while 1 bit of the absolute position value (in the embodiment the last bit) indicates the binary value, read by the second binary value sensor 30, of the associated incremental marking 24. Thus, the absolute position value obtained in this manner allows an unambiguous identification of the absolute position of the sensor arrangement 16 along the displacement path X. It is thereby possible to determine a positional relationship between the components 10, 12 in the accuracy range of the pole pitch p.

The absolute position according to the 5-bit value described above can also be combined with the detection result of the incremental sensor 32 to also detect an exact position of the sensor arrangement 16 within the pole pitch in order to determine the exact positional relationship of the sensor arrangement 16 along the displacement path X.

Figure 3:
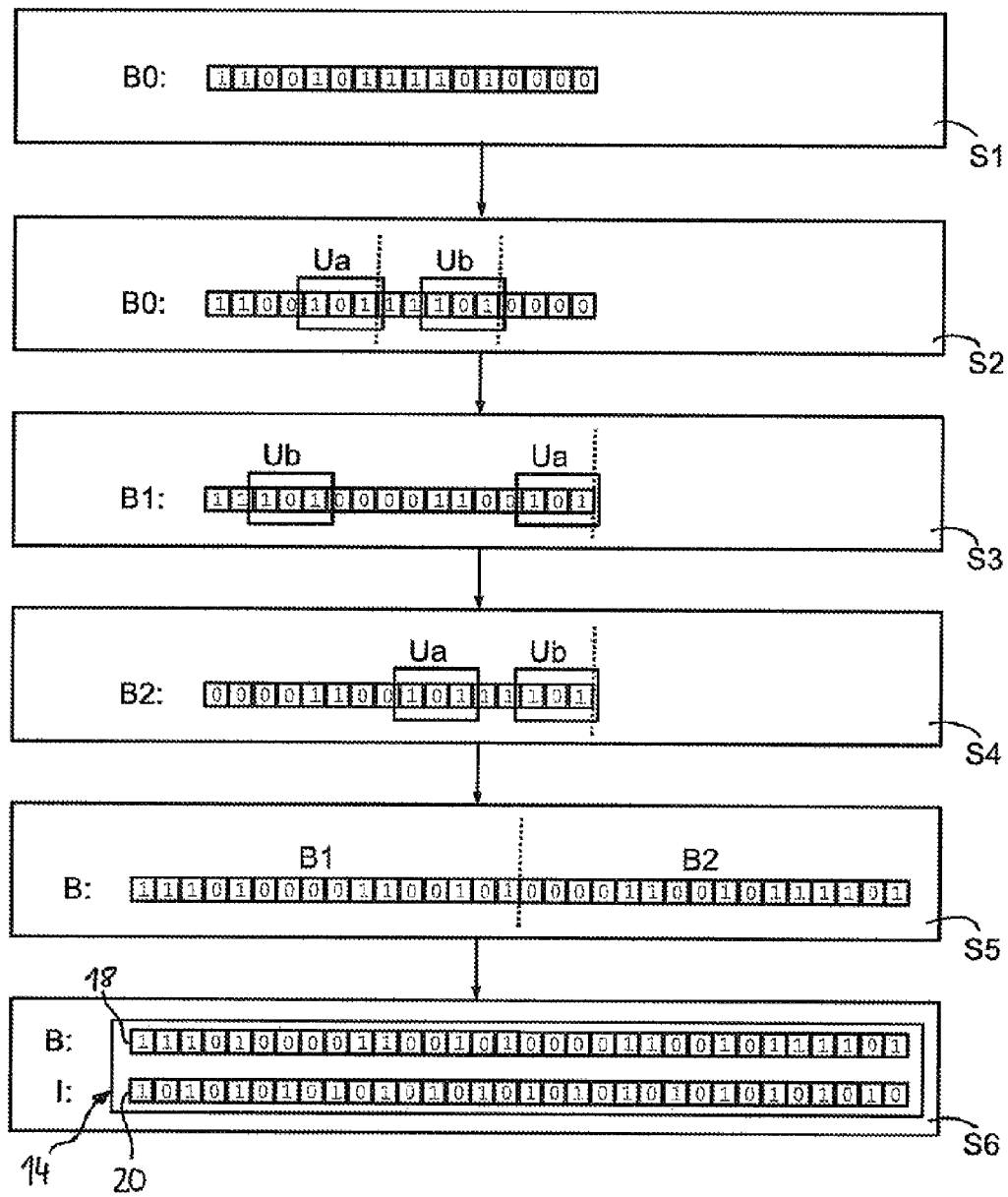
FIG. 3 shows a flow chart for a method for producing a marking arrangement according to an embodiment of the invention.

In the following, an embodiment of a method according to the invention for producing a marking arrangement for a position detecting device will be described with reference to FIG. 3.

In a first step S1, a binary initial De Bruijn sequence B0 of order N is provided, it being possible to select the order N according to the overall length L, to be detected, of the displacement path. With a marking arrangement according to the invention, a length of $$L=p\cdot 2^{N+1}$$

can be scanned, so that with a given pole pitch p, a value N for the order of the initial De Bruijn sequence B0 can be suitably selected according to the desired length L.

A method known per se, in particular a computer algorithm known per se, for generating De Bruijn sequences (for example based on De Bruijn graphs) can be used to calculate the initial De Bruijn sequence B0.

For illustration purposes, an initial De Bruijn sequence B0 of order 4 is assumed by way of example in the following further description of the method of the embodiment, where:
B0={1, 1, 0, 0, 1, 0, 1, 1, 1, 1, 0, 1, 0, 0, 0, 0}.

In a step S2, two subsequences Ua, Ub of length N−1 are identified in the initial De Bruijn sequence B0 which are identical to one another and occur shifted relative to one another by an uneven number of places within the initial De Bruijn sequence B0. It can be seen from the example of the initial De Bruijn sequence B0 of the fourth order that the subsequence {1, 0, 1} occurs a first time starting in fifth place and a second time starting in tenth place, so that the two identical subsequences Ua=Ub={1, 0, 1} occur in B0 shifted relative to one another by five places.

In a step S3, a first De Bruijn sequence B1 of order N is obtained in that the initial De Bruijn sequence B0 is shifted cyclically to such an extent that the shifted sequence ends with the first subsequence Ua. In other words, the initial De Bruijn sequence B0 is cut off after the first occurrence of subsequence Ua and the severed portion is rejoined at the start of the sequence to obtain the first De Bruijn sequence B1. Thus, in the embodiment of the initial De Bruijn sequence B0 of order 4, B0 is cut off after the first subsequence Ua, i.e. after the seventh place, and the severed subsequence (places 8 to 16 in B0) is rejoined at the start, so the first De Bruijn sequence B1 which is then obtained runs as follows:

B1={1, 1, 1, 0, 1, 0, 0, 0, 0, 1, 1, 0, 0, 1, 0, 1}.

Similarly, in a step S4 of the method, a second De Bruijn sequence B2 of order N is obtained by cyclically shifting the initial De Bruijn sequence B0 such that the second De Bruijn sequence B2 ends with the second subsequence Ub. In the embodiment, the De Bruijn sequence of order 4 is cut off after the second occurrence of subsequence {1, 0, 1}, i.e. after the twelfth place, and the severed places 13 to 16 are rejoined at the start of the sequence, so that the second De Bruijn sequence B2 in the embodiment is:

B2={0, 0, 0, 0, 1, 1, 0, 0, 1, 0, 1, 1, 1, 1, 0, 1}.

In a step S5, an absolute code sequence B is then obtained by linking the first De Bruijn sequence B1 and the second De Bruijn sequence B2. The second De Bruijn sequence B2 can be added to the end of the first De Bruijn sequence B1 so that it follows directly. Thus, in the embodiment, where N=4, the absolute code sequence for B is:

B={1, 1, 1, 0, 1, 0, 0, 0, 0, 1, 1, 0, 0, 1, 0, 1, 0, 0, 0, 0, 1, 1, 0, 0, 1, 0, 1, 1, 1, 1, 0, 1}.

The absolute code sequence B which is obtained also has a cyclical characteristic so that every cyclic shift of this sequence B by any number of places to the left or to the right in turn also forms an absolute code sequence according to the invention, in which every sequence of length N occurs precisely twice, in each case for different values of the associated incremental markings.

In a following step S6, an absolute track with a plurality of absolute markings is provided which encode the absolute code sequence B obtained by steps S1 to S5. For this purpose, for example a magnetic tape can be written on with the corresponding code sequence, for instance with an electromagnetic recording head known per se, the magnetic tape being magnetised, for example vertically to the plane of the tape at uniform intervals according to the pole pitch p. The binary information of each pole ("0" or "1") could be stored on the magnetic tape as the direction or intensity or orientation of the respective pole. In particular, a north pole which can be detected by a sensor arrangement could be defined as binary value "1" and a south pole could be defined as binary value "0".

In step S6 of the method of the embodiment, an incremental track consisting of a plurality of incremental markings associated with the absolute markings is also provided which encode an alternating incremental sequence. In the example described above, where N=4 with overall $2^{N+1}=2^{4+1}=32$ absolute markings, it is thus possible to provide an incremental sequence:

I={1, 0, 1, 0, 1, 0, 1, 0, 1, 0, 1, 0, 1, 0, 1, 0, 1, 0, 1, 0, 1, 0, 1, 0, 1, 0, 1, 0, 1, 0, 1, 0}

The incremental sequence can also be recorded on the magnetic tape on which the absolute track is also recorded, or it can be recorded on a further magnetic tape.

A marking arrangement which can be obtained by steps S1 to S6 can be attached to one of two components which can be moved (displaced or rotated) relative to one another in order to be scanned by a sensor arrangement attached to the other of the two components.

Figure 4:
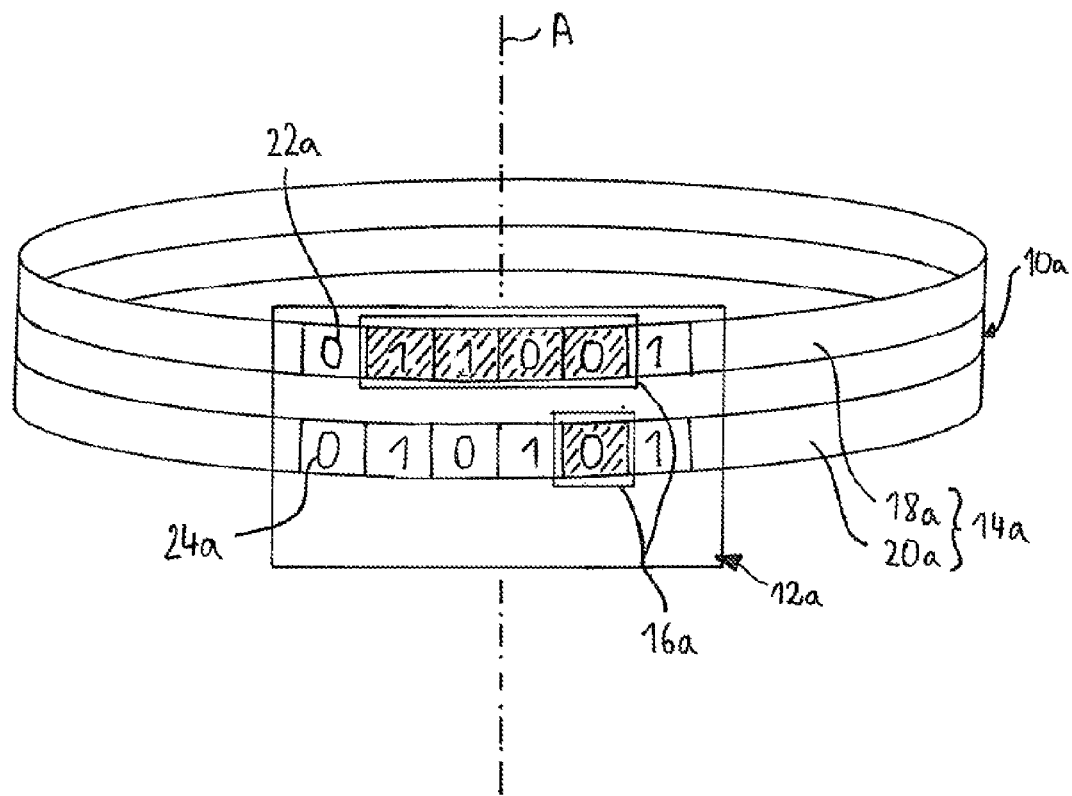
FIG. 4 is a schematic view of a position detecting device, configured as a rotary encoder, according to a second embodiment of the present invention.

FIG. 4 shows a position detecting device according to a second embodiment of the invention, which is configured as a rotary encoder to detect a rotational position of a first component 10a relative to a second component 12a. A marking arrangement 14a can be attached to the first component 10a such that the marking arrangement 14a revolves as a ring concentrically around a rotational axis A, around which the two components 10a, 12a can be rotated relative to one another. In the embodiment, the marking arrangement 14a comprises two tracks, an absolute track 18a and an incremental track 20a which run parallel to one another in the circumferential direction. Absolute markings 22a arranged following one another in the circumferential direction in the absolute track 18a encode an absolute code sequence which is composed, in a manner according to the invention described above, of two De Bruijn sequences of order N which are shifted cyclically relative to one another. Thus, the absolute track contains $2^{N+1}$ absolute markings 22a.

Analogously to the principle described in connection with the first embodiment, the absolute track 18a of the rotary encoder of the second embodiment of the invention can also be scanned by a sensor arrangement 16a arranged on the second component 12a, and with a technical configuration of the sensor arrangement 16a, for the readout of N absolute markings (for example by four first binary value sensors of the sensor arrangement 16a), an absolute track with overall $2^{N+1}$ absolute markings 22a can be scanned, which corresponds to a doubling of the scannable total angle compared to the principle, known from the prior art, of scanning only one De Bruijn sequence of order N.

Reference is made explicitly to the above description of the first embodiment regarding the scanning of the incremental track and of the processing of the values detected by the sensor arrangement 16a for determining an accurate positional relationship between the two components 10a, 12a. The constructive measures and functions described there can also be applied to the second embodiment in the same way or in an analogous way and there they achieve the same or analogous technical effects.

In a particularly advantageous manner, the absolute track 18a of the rotary encoder of the second embodiment can revolve fully around the first component 10a, i.e. as a closed ring concentric to the axis of rotation A, so that the first absolute marking 22a which stores the first bit of the absolute code sequence B immediately adjoins the last absolute marking 22a which stores the last bit of the absolute code sequence B. In this configuration, the cyclical characteristic of the absolute code sequence B can be utilised in a particularly advantageous manner, so that even without a defined starting or end point of the absolute code sequence, every sequence of N successive bits occurs precisely twice along the periphery of the first component 10a, i.e. with each complete revolution of the first component 10a, in each case for different values of associated incremental markings 24a. Thus, the rotational position between the components 10a, 12a can be unambiguously determined from the N-bit sequence (4-bit sequence in the embodiment) read out from the absolute track 18a and from the value of the associated incremental marking 24a.

If required, an exact position between adjacent absolute markings 22a can additionally be determined by evaluating a further incremental sensor, as is known per se in the prior art. Alternatively, the marking arrangement 14a could also revolve around the component 10a only along a portion, in particular a circular portion around the axis of rotation A and/or the axis of rotation A could be arranged outside the first component 10a as long as the sensor arrangement 16a is moved along the marking arrangement 14a and is able to scan the marking arrangement 14a when there is a relative movement between the first and second components 10a, 12a.

The present invention is not restricted to the described embodiments, but includes further embodiments within the scope of the claims. In particular, the scanning of the marking arrangement can be based on an optical signal detection, in which case the marking arrangement can comprise optically scannable markings as absolute markings or incremental markings (for example a bar code or a dot pattern) and the sensor arrangement can scan the markings by means of a laser beam and an optical detector. Optical scanning is particularly suitable for scanning relatively short displacement paths with a particularly high degree of accuracy.

The invention claimed is:

1. A position detecting device for detecting a positional relationship between a first component and a second component, comprising:
 a marking arrangement which is provided on the first component and has an absolute track and an incremental track, the absolute track having a plurality of absolute markings from which a binary absolute code sequence can be read, and the incremental track having a plurality of incremental markings which are associated with the absolute markings and from which an alternating incremental sequence can be read, and
 a sensor arrangement which is provided on the second component and is configured to scan the absolute markings and the incremental markings,
 wherein the absolute code sequence is formed from a first and a second De Bruijn sequence of order N which follow one another, the second De Bruijn sequence being a cyclic shift of the first De Bruijn sequence, in that the first De Bruijn sequence ends with a first subsequence of length N−1 and contains a second subsequence of length N−1 which is identical to the first subsequence and is shifted relative to the first subsequence by an uneven number of places,
 wherein the second De Bruijn sequence is shifted cyclically relative to the first De Bruijn sequence such that it ends with the second subsequence.

2. The position detecting device according to claim 1, wherein an electronic control means which is connected to the sensor arrangement to receive a first sensor signal corresponding to a scanning of the absolute track, a second sensor signal corresponding to a scanning of the incremental track and a third sensor signal corresponding to a detected relative position between two successive incremental markings, and which is configured to determine the positional relationship between the components on the basis of the first sensor signal, the second sensor signal and the third sensor signal.

3. The position detecting device according to claim 2, wherein the electronic control means comprises a memory means in which an absolute position value, formed by N+1 bits, is stored, the electronic control means setting N bits of the absolute position value according to the first sensor signal and setting one bit of the absolute position value according to the second sensor signal.

4. The position detecting device according to claim 1, wherein the sensor arrangement configured to detect exactly N successive absolute markings.

5. The position detecting device according to claim 1, wherein the scanning of the marking arrangement based on a magnetic interaction between the sensor arrangement and the absolute markings and/or the incremental markings.

6. The position detecting device according to claim 1, wherein the position detecting device is configured to detect a linear displacement position between the components.

7. The position detecting device according to claim 1, wherein the position detecting device is configured to detect a rotational position between the components.

8. The position detecting device according to claim 7, wherein the absolute track and the incremental track revolve fully around an axis of rotation A of the components, a beginning of the second De Bruijn sequence adjoining an end of the first De Bruijn sequence and a beginning of the first De Bruijn sequence adjoining an end of the second De Bruijn sequence.

9. A method for producing a marking arrangement for a position detecting device for detecting a positional relationship between a first component and a second component the position detecting device comprising a sensor arrangement for scanning the marking arrangement, in particular for a position detecting device according to any one of the preceding claims, the method comprising the following steps:
 provision of an initial De Bruijn sequence of order N,
 identification of a first subsequence of length N−1 and of a second subsequence of length N−1 which are identical to one another and occur within the initial De Bruijn sequence, shifted relative to one another by an uneven number of places,
 provision of a first De Bruijn sequence of order N by cyclically shifting the initial De Bruijn sequence so that the first De Bruijn sequence ends with the first subsequence,
 provision of a second De Bruijn sequence of order N by cyclically shifting the initial De Bruijn sequence so that the second De Bruijn sequence ends with the second subsequence,
 provision of an absolute code sequence by linking the first De Bruijn sequence and the second De Bruijn sequence,
 provision of an absolute track from a plurality of absolute markings encoding the absolute code sequence, and
 provision of an incremental track from a plurality of incremental markings which are associated with the absolute markings and encode an alternating incremental sequence.

10. The position detecting device according to claim 1, comprising:
 the marking arrangement being obtainable by a method comprising the following steps: provision of an initial De Bruijn sequence of order N, identification of a first subsequence of length N−1 and of a second subsequence of length N−1 which are identical to one another and occur within the initial De Bruijn sequence, shifted relative to one another by an uneven number of places,
 provision of a first De Bruijn sequence of order N by cyclically shifting the initial De Bruijn sequence so that the first De Bruijn sequence ends with the first subsequence,
 provision of a second De Bruijn sequence of order N by cyclically shifting the initial De Bruijn sequence so that the second De Bruijn sequence ends with the second subsequence,
 provision of an absolute code sequence by linking the first De Bruijn sequence and the second De Bruijn sequence,
 provision of an absolute track from a plurality of absolute markings, encoding the absolute code sequence, and
 provision of an incremental track from a plurality of incremental markings which are associated with the absolute markings and encode an alternating incremental sequence.

* * * * *